United States Patent Office 2,957,933
Patented Oct. 25, 1960

2,957,933
PRODUCTION OF COMPOUNDS OF THE BETA-CYCLO-GERANYLIDENE SERIES

Horst Pommer and Wilhelm Sarnecki, Ludwigshafen (Rhine), Germany, assignors to Badische Anilin- & Soda-Fabrik Aktiengesellschaft, Ludwigshafen (Rhine), Germany No Drawing. Filed June 6, 1958, Ser. No. 740,187
Claims priority, application Germany June 8, 1957
24 Claims. (Cl. 260—410.9)

This invention relates to the production of compounds of the beta-cyclogeranylidene series with the aid of phosphines, and also to some new compounds of this series.

In recent years, many methods have been described for the synthesis of compounds which contain the beta-cyclogeranylidene radical (I):

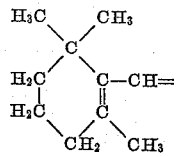

I

Interest in research on the synthesis of compounds of the cyclogeranylidene series is not surprising because many natural substances, which play a considerable part in human nutrition or in physiology, contain this radical (I), as for example many carotenoids, such as beta-carotene and vitamin A.

In the known methods (see for example O. Isler, Chimia, volume 4 (1950), page 116 et seq.; H. H. Inhoffen and F. Bohlmann, Fortschr. chem. Forschung, 1 (1949), pages 175–210; F. Bohlmann, Angew. Chem., 62 (1950), pages 4 to 7; E. Vogel and H. Knobloch, "Chemie und Technik der Vitamine," 3rd edition, (1950), volume 1, pages 18 to 150; J. S. N. Jones, Chem. Prod. chem. News, 13 (1950), page 206; J. G. Baxter, Fortschritte der Chemie org. Naturstoffe, Springer Verlag, Vienna, volume 9 (1952), page 78; H. H. Inhoffen and H. Siemer, ibid., pages 1 to 77; H. O. Huisman and collaborators, Rec. des Trav. chim. des Pays-Bas, volume 71 (1952), page 911; N. A. Milas, "The Vitamins," volume 1, Academic Press Soc. Publishers, New York (1954), pages 4 to 58; O. Isler, Angew. Chem., 68 (1956), pages 547 to 553, and O. Isler and M. Montavon, Chimia, 12 (1958), page 1), either the pure beta-isomers of cyclocitral (II) or of ionone (III) or, however, also compounds of the general constitution IV or V, are used as initial materials for the synthesis of compounds of the cyclogeranylidene series.

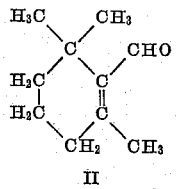
II

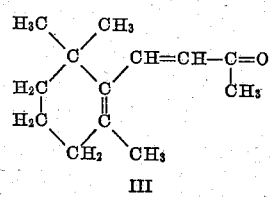
III

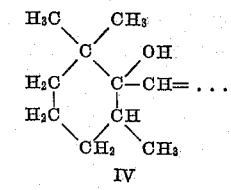
IV

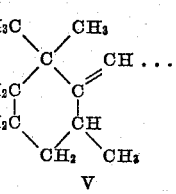
V

Experience has taught that beta-cyclocitral is not an economically useful initial material for the synthesis of carotenoids (the term carotenoids being here and hereinafter understood as including also vitamin A and its functional derivatives) or the perliminary stages of the same. Although it is true that syntheses of compounds of the types IV and V have often been described, they are too troublesome for technical methods and have therefore not been used in practice.

It can thus be asserted in recapitulation that hitherto the preferred initial material for the synthesis of compounds of the beta-ionylidene series is beta-ionone (III) which is readily accessible technically and is prepared in large amounts as a perfume (see for example the technical synthesis of vitamin A and of beta-carotene, comprehensively referred to by O. Isler in Zeitschrift für Angewandte Chemie, 68 (1956), page 547).

The object of this invention is a specially advantageous process for the production of compounds having the radical of beta-cyclogeranylidene. A further object of the invention is the production of biologically-active dyestuffs for food.

The compounds having the radical of beta-cycloger-anylidene according to this invention are obtained when a compound of the general formula:

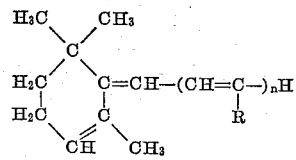

in which $n$ represents 0, 1, 2, 3 or 4 and R represents hydrogen or $CH_3$, is reacted with a triarylphosphine and a proton donor or a hydrosalt of a triarylphosphine on the one hand and with an oxo compound with the agency of a proton acceptor on the other hand.

Compounds which fall within the general formulae given above are for example
2.6.6 - trimethylcyclohexene - (2) - ylidene - (1) - methylene (VI),
4 - (2′.6′.6′ - trimethylcyclohexene - (2′) - ylidene - (1′)) - butene-(2) (VII),
5 - (2′.6′.6′ - trimethylcyclohexene - (2′) - ylidene - (1′)) - 3-methylpentadiene-(1.3) (VIII),
8 - (2′.6′.6′ - trimethylcyclohexene - (2′) - ylidene - (1′)) - 6-methyl-octatriene-(2.4.6) (IX) and
9 - (2′.6′.6′ - trimethylcyclohexene - (2′) - ylidene - (1′)) - 3.7-dimethyl-nonatetraene-(1.3.5.7) (X).

These compounds have the formula:

VI 

VII 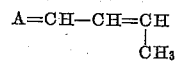

VIII 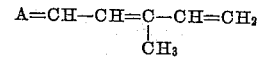

IX 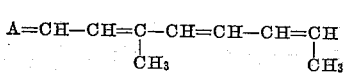

X 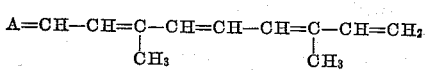

in which A represents the grouping

In these compounds, the odd groups, i.e.

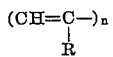

where n is 1 or 3, have R equal to CH₃ and the even-numbered groups

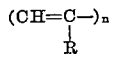

where n is 2 or 4, have R equal to H.

The initial compound 4-(2'.6'.6'-trimethylcyclohexene-(2')-ylidene-(1'))-butene-(2) (VII) is readily obtainable in good yields by reduction of beta-ionone, for example by means of lithium alanate or aluminum isopropylate by the method of Meerwein and Ponndorf (see Neuere Methoden der präparativen organischen Chemie, 2nd edition (1944), page 139, Verlag Chemie), to beta-ionol and treatment of the same with agents which split off water, for example paratoluenesulfonic acid.

The initial compound (VIII) is obtainable by reacting beta-ionone in a manner known per se with acetylene to form ethinyl-beta-ionol and adding on hydrogen to the acetylene linkage by partial hydrogenation. The vinyl-beta-ionol (VIII') is converted by splitting off water into 5 - (2'.6'.6' - trimethylcyclohexene - (2')-ylidene-(1'))-3-methylpentadiene-(1.3) (VIII) (see the following formula scheme:

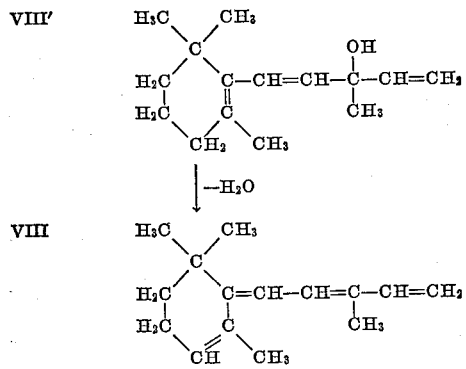

The initial compound (IX) can be obtained by treating for example 8-(2'.6'.6'-trimethylhexene-(1')-yl-(1'))-6-methyl-2-hydroxy-octatriene-(3.5.7) with agents which split off water.

As proton donors there are eminently suitable strong inorganic acids, especially the halogen hydracids and also those oxygen acids of sulfur and phosphorus which do not exert an oxidizing or reducing action under the reaction conditions. Moreover all acids are suitable which form with triarylphosphines, salts of the type:

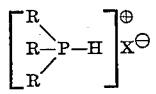

in which R represents identical or different aromatic radicals, X⊖ represents the radical of an inorganic or strong organic acid, for example trichloracetic acid or benzenesulfonic acid. The expression proton donors includes all compounds which give off protons and which an expert after becoming acquainted with this patent description deems to be suitable for the process according to this invention.

As proton acceptors there are to be understood all substances which are acid-binding agents or act like acid-binding agents; to these belong inorganic bases, as for example alkali metal hydroxides, alkaline earth metal hydroxides, alkali and alkaline earth metal amides and ammonia; among organic bases there are suitable for example strongly basic amines, such as piperidine or diethylamine; similarly alkali and alkaline earth metal alcoholates, alkali and alkaline earth metal ketone enolates, and in many cases also organo-metallic compounds, such as lithium methyl, sodium methyl, phenyl sodium, phenyl lithium, butyl lithium, sodium acetylide, indene potassium and Grignard compounds, such as ethyl magnesium bromide, are also suitable.

Oxo compounds suitable for the process according to the present invention are compounds which contain in the molecule at least once a carbonyl group. The term carbonyl group is to be understood as the group O=C< to which are attached, each to a carbon atom, two organic radicals or a hydrogen atom and an organic radical. Compounds which satisfy this definition are aliphatic and aromatic aldehydes and ketones and formic acid esters.

As examples of oxo compounds suitable for the reaction there may be mentioned the following aldehydes and ketones: formaldehyde, acetaldehyde, propionaldehyde, butyraldehyde, isobutyraldehyde, acrolein, alpha-methylacrolein, crotonaldehyde, hexadienal, octatrienal, benzaldehyde, cinnamaldehyde, phenylacetaldehyde, acetone, butyrone, methyl ethyl ketone, cyclocitral, citral, glyoxylic acid, glyoxylic acid esters, glyoxal, glycol aldehyde, etherified or esterified glycol aldehydes, acetoacetic acid ester, oxomalonic esters, oxalacetic acid esters, phenylpentadienal, beta-alkoxyacroleins, for example beta-ethoxyacrolein and alpha-methyl-beta-ethoxyacrolein, alpha-methyl - beta - acetoxyacrolein, alpha - methyl-beta-chloracrolein, vinyl methyl ketone, beta-chlorvinyl methyl ketone, beta-methoxy-vinyl methyl ketone, chloracetaldehyde, beta-formylacrylic acid, beta-formylacrylic acid esters, beta-formylcrotonic acid esters, propargyl aldehyde, butinone, 3-methyl-butene-(2)-al-(4), 3-methyl-butene-(2)-al-(4)-ol-(1), its ethers, its esters, 1-carboxy-3-methyl-butene-(2)-al-(4) and its esters, N.N-dialkyl-1-amino - 3 - methyl-butene-(2)-al-(4), 4.4-dihydroxyethyl-pentene-(3)-al-(1), 4-acetoxypentene-(3)-al-(1), maleic dialdehyde, acetylene dialdehyde, 5-acetoxy-4-methyl-pentadiene-(2.4)-al-(1), 5-ethoxy - 4 - methyl-pentadiene-(2.4)-al-(1), 5 - carboxy - 4 - methyl-pentadiene-(2.4)-al-(1), 5 - carbalkoxy-4-methyl-pentadiene-(2.4)-al-(1), 5-methoxy-4-methyl-pentadiene-(2.4)-al-(1), 5-carbmethoxy-4-methyl-pentadiene-(2.4)-al-(1), 6-methoxy-4-methyl-pentadiene - (2.4) - al - (1), 6-acetoxy-4-methyl-pentadiene-(2.4)-al-(1), 4-methyl-hexadiene-(2.4)-al-(1), 4-methyl-hexadiene-(2.4)-al-(1)-acid-(6) and its esters, 4-methyl-hexadiene - (2.4)-al-(1), 7-carboxy-2.6-dimethyl-heptatriene-(2.4.6) - al - (1), 7-carbalkoxy-2.6-dimethyl-heptatriene-(2.4.6)-al-(1), 6-dimethylamino - 4 - methyl-hexadiene-(2.4)-al-(1), 7 - ethoxy-4-methyl-heptatriene-(2.4.6)-al-(1), 7-acetoxy-4-methyl-heptatriene-(2.4.6)-al-(1), 7-carboxy - 4 - methyl-heptatriene-(2.4.6)-al-(1), 7-carbethoxy-4-methyl-heptatriene-(2.4.6)-al-(1), 4-methyl-octatrienal, 2.7 - dimethyl-octadiene-(2.6)-ine-(4)-dial-(1.8), 2.7-dimethyl-octatriene-(2.4.6)-dial-(1.8), 8-alkoxy - 2.6 - dimethyl-octatriene-(2.4.6)-al-(1), 9-carboxy-4.8-dimethyl-nonatetraene-(2.4.6.8)-al-(1), 9-carbalkoxy-4.8-dimethyl-nonatetraene-(2.4.6.8)-al-(1), 4.8-dimethyl-decatetraenal, 9-carboxy-4.9-dimethyl-nonatetraene-(2.4.6.8)-al-(1), 11-carboxy-2.5.10-trimethyl-undecapentaene-(2.4.6.8.10)-al-(1), 13 - carboxy-4.8.12-trimethyl-tridecahexaene - (2.4.6.8.10.12) - al - (1), 13-carboxy-4.9.13-trimethyl-tridecahexaene-(2.4.6.8.10.12)-al-(1), 4.8-dimethyl-dodecatetraene-(2.4.8.10)-ine-(6)-dial-(1.12) and 4.8-dimethyl-dodecapentaene-(2.4.6.8.10)-dial-(1.12).

The esters of formic acid may also be reacted with excellent yields according to this invention.

As the above list (which is merely for purposes of illustration and is not intended to be limitative) indicates, the carbonyl groups may bear a great variety of substituents. They may be not only saturated or unsaturated hydrocarbon radicals but also radicals containing oxygen, sulfur, halogen, nitrogen and/or other atoms; for the expert it is obvious that the substituents on the carbonyl groups must not contain radicals which would interfere with the reaction, and it is also obvious that the oxo compounds must not be of such high molecular weight that they do not dissolve sufficiently under the reaction conditions.

It may be said quite generally that for reaction with the 2.6.6-trimethyl-cyclohexene-(2)-ylidene-(1) derivatives according to the invention, those aldehydes and dialdehydes are preferred which contain at least one unsaturated carbon-carbon linkage in conjugation to the carbonyl double linkage and, when they are branched, those which have preferably methyl radicals or also ethyl radicals as side radicals. The terminal groups of the preferred aldehydes can be hydrocarbon radicals, or hydroxyl, ether, carboxylic, ester or amino groups. The maximum number of unsaturated carbon-carbon linkages in the preferred aldehydes and dialdehydes should not exceed 8. The total number of carbon atoms in the oxo compounds, excluding the carbon atoms of any ether, ester or amino radicals present, should not exceed 30.

The term triarylphosphine is intended to include all compounds suitable for the reaction in the molecule of which three aromatic rings are each attached to a phosphorus atom. As aromatic rings there are to be understood above all benzene rings and benzene rings substituted by hydrocarbon radicals, as for example toluene.

The reactions are carried out in organic solvents which are liquid under the reaction conditions. The choice of the solvent is mainly dependent on the choice of oxo components and the proton donors and acceptors used. It is not in all cases necessary to work away from water.

As examples there may be mentioned: ethers, such as tetrahydrofurane, dimethyltetrahydrofurane, dioxane, hydrocarbons, such as benzene, toluene, xylene, cyclohexane, cyclo-octane, iso-octane, alcohols, such as methanol, ethanol, isopropanol, propanol, butanol and benzyl alcohol. Strongly polar solvents are preferred, for example dimethylformamide, acetonitrile, N-methylpyrrolidone, ethyl acetate, nitrobenzene, and methanol.

Mixtures of different solvents may also be used.

The reaction temperatures may be varied within wide limits, for example from −50° C. to +100° C., and are dependent inter alia on the melting and boiling points of the solvents. In general it is advantageous to work at temperatures of about 0° C. to +10° C.

The relative proportions of the initial materials, especially the ratio of the 2.6.6-trimethyl-cyclohexene-(2)-ylidene-(1) component to the triarylphosphine and to the proton donor or to the hydrosalt of a triarylphosphine, is advantageously chosen, for practical reasons, approximately stoichiometrical, and also the oxo compound to be reacted.

When a dioxo compound is used and it is desired to react it on both the oxo groups it is often advantageous to use the dioxo compound in a quantity below the stoichiometrical amount. The proton acceptors are also usually used in equivalent proportions, but often a multiple of the equivalent may be advantageous, for example when oxo carboxylic acids are used as one reaction component or when the proton donor is used in excess.

In some cases the yields may be improved by protecting the reaction mixture from access of air by a gas which is inert or slow to react, as for example nitrogen or argon.

It should be emphasized that the invention is not limited to the choice of specific amounts of initial materials, specific triarylphosphines, specific solvents, temperatures or other details which can be established by an expert from the information given in this description without the exercise of inventive ingenuity. The statements in the present description merely therefore give some prescriptions for purposes of explanation but the invention is not limited thereto.

Thus for example 4-(2'.6'.6'-trimethyl-cyclohexene-(1')-yl-(1'))-2-methyl-1-ethoxy-butadiene-(1.3) (XI), which can readily be converted by treatment with acids into 4-(2'.6'.6'-trimethylcyclohexene-(1')-yl-(1'))-2-methyl-butene-(2)-aldehyde-(1) and constitutes a valuable perfume as well as the initial material for many carotenoid syntheses, including the synthesis of vitamin A and beta-carotene, can be recovered in excellent yields from the compound VII and ethyl formate.

In order to explain the reaction on which the present invention is based, but of which every detail of the reaction mechanism is not clarified, some characteristic reactions will be explained diagrammatically.

In the following diagrammatic reproductions, triphenylphosphine is always shown as the triarylphosphine, hydrochloric acid as the proton donor and sodium methylate as the proton acceptor, and dimethylformamide as the solvent, for the sake of simplicity.

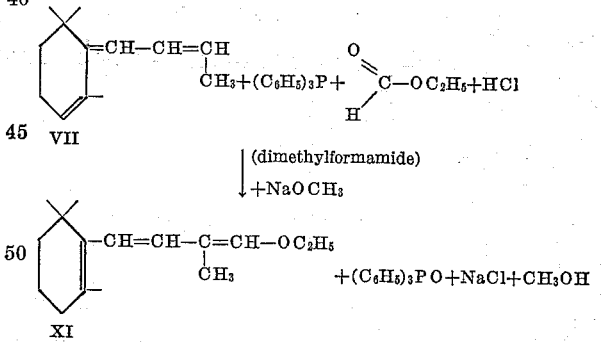

A valuable non-toxic vitamin A-active isoprenoid food dyestuff (XII) is obtained for example from VII and 9-carboxy-4.8-dimethyl-nonatetraene-(2.4.6.8)-al-(1).

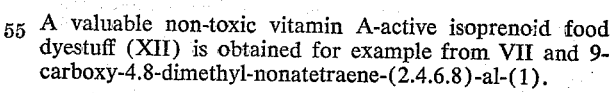

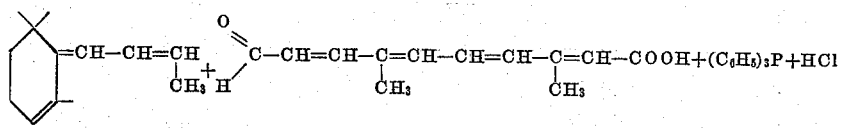

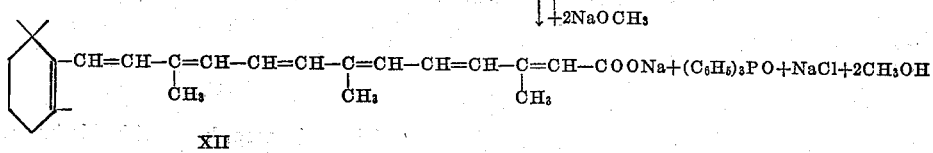

By reaction of 2 mols of the compound VII with 1 mol of 4.8-dimethyl-dodecapentaene-(2.4.6.8.10)-dial-(1.12) there is obtained beta-carotene (XIII) which is important as provitamin A and natural dyestuff.

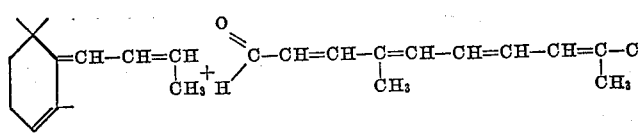

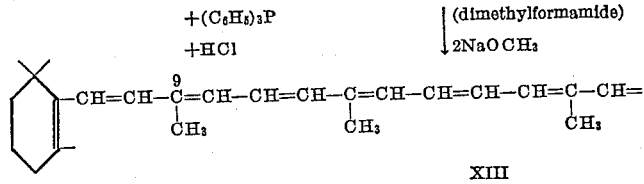

In almost all cases, in syntheses with compound VII as the initial material, there are at first obtained compounds which are not unitary in their stereochemical structure. A cis-trans isomerism forms at the linkage position (in position 9 of the beta-cyclogeranylidene system). The pure trans compounds, which are often desirable, can usually readily be obtained by treatment of the stereomeric mixtures with isomerizing reagents, as for example mineral acids or halogens such as iodine and also by irradiation with light of suitable wavelengths.

By the reaction of compound VIII with ethyl formate there is obtained the enol ether of the so-called beta-$C_{16}$-aldehyde, an important intermediate product of the beta-carotene synthesis according to O. Isler (see Angew. Chem., 68 (1956), page 547), 6-(2'.6'.6'-trimethyl-cyclohexane-(1')-yl-(1')) - 4 - methyl - 1 - ethoxyhexatriene-(1,3,5), (XIV).

The relatively stable compounds of the 9-cis-series are never formed in appreciable amounts.

The great technical and economical importance of the beta-cyclogeranylidene compounds has already been described herein and underlined by the choice of the compounds reproduced by formulae. A considerable enrichment of technique by the process according to this invention consists in the fact that with the aid of triarylphosphines, a hydrocarbon can be converted by reaction with oxo compounds in a specially protective manner into modified compounds, above all vinylogous compounds. The compounds prepared according to this invention form in good yields and high purity. It is also very advantageous that the trimethyl-cyclohexene-ylidene derivatives to be used as initial materials are readily accessible. These are retro-compounds and it is there-

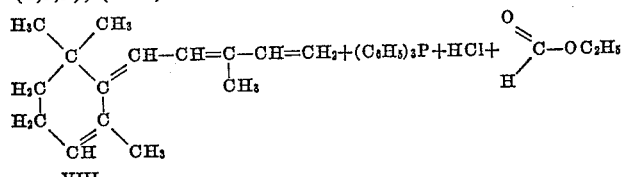

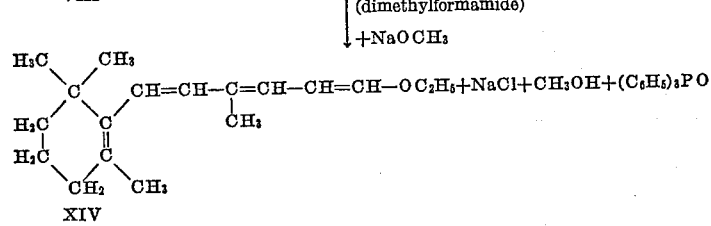

Beta-carotene (XIII) is obtained from one mol of the compound VIII and ½ mol of 2.7-dimethyl-octatriene-(2.4.6)-dial-(1.8) (XV) in excellent purity and yield.

fore a further advantage of the invention that retro-compounds can be used for the synthesis of compounds with vitamin A constitution. Another advantage of the process

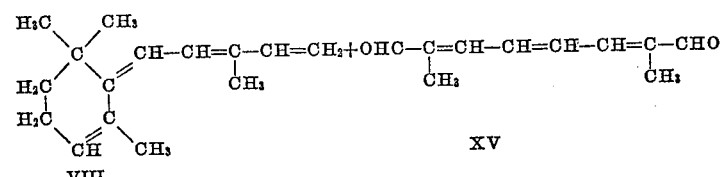

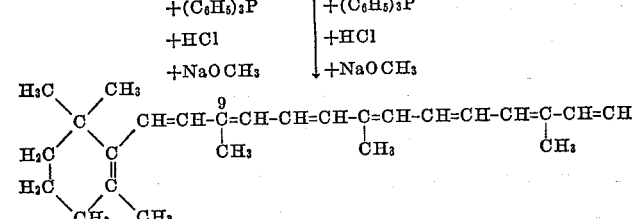
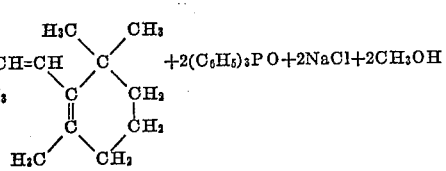

In syntheses with the compound VIII as initial material there are obtained in general compounds of the all-trans-beta-ionylidene-ethylidene series; if all isomerizing influences, such as light, acids or halogens, are avoided during the working up, there may also be isolated cis-compounds.

in accordance with this invention resides in the fact that no intermediate stages need be isolated.

An almost innumerable number of compounds of the beta-cyclogeranylidene series may now be prepared in a specially simple and economical process, including intermediate products, compounds of the vitamin A and beta-carotene series, pharmaceutical products and also isoprenoid dyestuffs.

The invention renders it possible to prepare many new colored compounds which are suitable for the coloring of foodstuffs because their structure resembles that of vitamin A; for example the compounds XII, their esters and

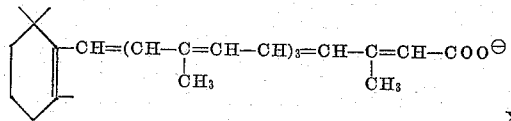

XVI are valuable foodstuff colorants because their shade of color is stronger than that of vitamin A and weaker than that of beta-carotene.

The following examples will further illustrate this invention but the invention is not restricted to these examples. The parts specified are parts by weight unless otherwise stated. Parts by volume stand in the same relation to parts by weight as the liter to the kilogram.

*Example 1*

34 parts of triphenylphosphine hydrobromide, 13 parts of 2.6.6-trimethyl-cyclohexene-(2)-ylidene-(1)-methylene (VI) and 40 parts of anhydrous tetrahydrofurane are stirred for 50 hours at room temperature. Then the tetrahydrofurane is distilled off in vacuo and the residue dissolved in 40 parts of dimethylformamide. 20 parts of 7-carbethoxy-2.6-dimethylheptatriene-(2.4.6)-al-(1) dissolved in 100 parts of dimethylformamide are added to this solution and then at 0° C. a solution of 5.5 parts of sodium methylate in 15 parts of methanol is added. The mixture is stirred for another 14 hours at room temperature, then acidified with 10% phosphoric acid and extracted several times with petroleum ether. The combined petroleum ether extracts are washed until neutral with sodium bicarbonate solution and water and dried over sodium sulfate. After distilling off the petroleum ether there remain 5 parts of oily residue which contains the ethyl ester of vitamin A acid $\lambda_{max}$ 354 millimicrons, $\epsilon=17,400$.

*Example 2*

200 parts of beta-ionone are dissolved in 400 parts of absolute ether and dripped at $-15°$ C., while stirring and leading nitrogen over, into a suspension of 20 parts of lithium aluminum hydride in 500 parts of absolute ether. It is stirred for an hour at 0° C., a solution of 20 parts of ethyl acetate in 50 parts of absolute ether is carefully added and decomposition effected after 15 minutes stirring with 200 parts of an aqueous cold saturated solution of ammonium chloride. The product is filtered free from the voluminous precipitate, the filtrate dried over sodium sulfate and the solvent distilled off. The residue is dissolved in 500 parts of benzene and, after the addition of 0.5 part of para-toluene sulfonic acid, heated in a circulatory apparatus until no further water separates. The benzene solution is cooled to $+5°$ C., filtered and the filtrate freed from solvent and distilled. At a boiling point of 115° to 118° C. at 13 Torr, 160 parts of 4-(2'.6'.6'-trimethyl-cyclohexene-(2')-ylidene)-butene-(2) are obtained. In methanolic solution, this $C_{13}$-retro-hydrocarbon shows a maximum of the light absorption at 273 millimicrons ($\epsilon=30,000$) and inflections at 263 millimicrons ($\epsilon=24,800$) and 285 millimicrons ($\epsilon=23,200$).

90 parts of the 4-(2'.6'.6'-trimethyl-cyclohexene-(2')-ylidene)-butene-(2) (VII) and 165 parts of triphenylphosphine hydrobromide are suspended in 200 parts of dimethyl formamide and stirred for 12 hours at room temperature. 70 parts of 5-carboxy-4-methyl-pentadien-(2,4)-al-(1) (melting point 177° C., white needles from water, $\lambda_{max}$ (in methanol)=274 millimicrons ($\epsilon=28,000$)) dissolved in 150 parts of isopropanol, are dripped into the clear solution. It is cooled to $-40°$ C. while stirring. Then 190 parts of a 30% solution of sodium methylate in methanol is allowed to flow in rapidly while stirring; the temperature thereby rises to $-10°$ C. It is stirred for another 5 minutes at this temperature and then neutralized with 10% sulfuric acid (acid to Congo). After 60 minutes stirring at room temperature, the vitamin A acid has crystallised out. It is filtered off sharply by suction and washed with a little ice-cold isopropanol. Upon the addition of water there crystallises from the filtrate a further small amount, mainly all-trans-vitamin A acid. The filter cake is suspended in 500 parts of water and stirred for 5 hours at room temperature, then filtered off by suction and washed with water. After drying over calcium chloride in vacuo at 40° to 50° C., there are obtained 110 parts of vitamin A acid as a mixture of the all-trans- and 9.10-cisisomers; the melting point lies between 146° and 158° C. The isomer mixture shows $\lambda_{max}$ (in methanol)=347 to 349 millimicrons ($\epsilon$ about 40,000). By fractional crystallisation from ethanol or methanol, the stereomeric vitamin A acids may be separated. The all-trans-vitamin A acid of the melting point 180° to 182° C., $\lambda_{max}$ (in methanol)=351 to 352 millimicrons, ($\epsilon=45,000$) is obtained in the form of broad brilliant yellow needles and the 9.10-cis-vitamin A acid of the melting point 189° to 190°, $\lambda_{max}$ (in methanol)=343 millimicrons ($\epsilon=36,500$) in the form of pale yellow needles united into clusters. The ratio of the stereo-isomers varies between 20% and 40% of the all-trans form and is to a certain extent dependent on the reaction temperature.

*Example 3*

90 parts of 4-(2'.6'.6'-trimethyl-cyclohexene-(2')-ylidene)-butene-(2) and 150 parts of triphenylphosphine hydrochloride are stirred in 150 parts of dimethylformamide for 36 hours and, after adding a solution of 70 parts of 5-carboxy-4-methyl-pentadiene-(2,4)-al-(1) in 150 parts of isopropanol, further worked up as described in Example 2. The yield of vitamin A acid as a mixture of the stereoisomers amounts to 115 parts; the proportion of the all-trans-isomer does not exceed 25%.

*Example 4*

90 parts of 4-(2'.6'.6'-trimethyl-cyclohexene-(2')-ylidene)-butene-(2) and 200 parts of triphenylphosphine hydrobromide are stirred in 200 parts of dimethylformamide for 12 hours. Then 80 parts of 5-carbethoxy-4-methyl-pentadiene-(2,4)-al-(1) melting point 58° C., $\lambda_{max}$ (in methanol)=272 millimicrons, ($\epsilon=31,000$), dissolved hot in 50 parts of dimethylformamide are added. The mixture is cooled while stirring to $-40°$ C. and at this temperature there are added dropwise 90 parts of a 30% solution of sodium methylate in methanol and the whole allowed to warm up to 0° C. slowly in the course of an hour. It is then covered with petroleum ether, 70 parts of 10% sulfuric acid added and stirred for 30 minutes. The petroleum ether layer is separated and washed several times with water. After drying over sodium sulfate, it is filtered through a short column (for example about 20 cm. long and 2.5 cm. diameter filled with aluminum oxide according to Brockmann, activity III) and the filtrate distilled. At a boiling point of 159° to 164° C. at 0.005 Torr there are obtained 90 parts of vitamin A acid ethyl ester as a mixture of the stereoisomers ($\lambda_{max}=346$ to 349 millimicrons, $\epsilon=38,000$).

*Example 5*

180 parts of 4-(2'.6'.6'-trimethyl-cyclohexene-(2')-ylidene)-butene-(2) (VII) and 300 parts of triphenylphosphine hydrochloride are dissolved in 500 parts of dimethylformamide and shaken for 15 hours at room temperature. To the clear solution there are then added 90 parts of freshly distilled ethyl formate and cooled to $-10°$ C. While stirring powerfully, there is then allowed to flow in rapidly a solution of 60 parts of sodium methylate in 200 parts of methanol. It is stirred, while leading over nitrogen, for another 12 hours, covered with petroleum ether and about 150 parts of water added. The petroleum ether layer is separated and the aqueous solution extracted several times with petroleum ether. The combined, almost colorless, extracts are washed carefully with water and dried at $-5°$ C. over sodium sulfate. After filtration and distillation there are obtained at the boiling point 89° to 90° C. at 0.15 Torr 160 parts of 4-(2'.6'.6'-trimethyl-cyclohexene-(1')-yl-(1'))-2-methyl-1-ethoxy-butadiene-(1.3), $\lambda_{max}$ (in methanol)=296 millimicrons, ($\epsilon$=27,000).

Example 6

90 parts of 4-(2'.6'.6'-trimethyl-cyclohexen-(2')-ylidene)-butene-(2) (VII) and 165 parts of triphenylphosphine hydrobromide are suspended in 200 parts of dimethylformamide and stirred for 12 hours at room temperature. To the clear solution there are added 60 parts of alpha-methyl-beta-ethoxy-acrolein (which can be prepared from methyl-malonodialdehyde tetraethyl acetal by treatment with water in the presence of acid ion exchange compounds while heating—boiling point 94° C. at 10 Torr—and cooled to $-10°$ C. While stirring powerfully, there are then allowed to flow in rapidly 100 parts of a methanol solution containing 30 parts of sodium methylate. The temperature rises to about $+10°$ to 20° C. It is stirred for another 2 hours at room temperature and then covered with about 150 parts of petroleum ether. Then 100 parts of water are dripped in while stirring powerfully, the petroleum ether solution separated and the dark aqueous dimethylformamide solution extracted several times with petroleum ether. The combined extracts are washed several times with water and dried for 12 hours at 0° C. over sodium sulfate. After filtering off the drying agent the product is distilled under reduced pressure. At the boiling point 110° to 114° C. at 0.1 Torr there are obtained 89 parts of 6-(2'.6'.6'-trimethylcyclohexene - (1') - yl - (1'))-2.4-dimethyl-1-ethoxy-hexatriene-(1.3.5).

Example 7

90 parts of 4-(2'.6'.6' - trimethyl - cyclohexene-(2')-ylidene)-butene-(2) (VII) and 136 parts of triphenylphosphine are stirred in 200 parts of dimethylformamide for 12 hours at room temperature and, after cooling to $-20°$ C., a solution of 18 parts of hydrogen chloride gas in 100 parts of methanol slowly added (HCl content titrimetrically determined). It is stirred for another hour at 0° C. and then 100 parts of 9-carboxy-4.8-dimethyl-nona-tetraene-(2.4.6.8)-al-(1) (prepared by saponification of its ethyl ester) which is obtained, in analogy to the process of British patent specification No. 784,628 from 7-carbethoxy - 2.6 - dimethyl - heptatriene - (2.4.6)-al-(1) by acetalisation, addition of vinyl ethyl ester, deacetalisation of the reaction product and splitting off alcohol pale yellow needles of melting point 169° C. are added. After all has passed into solution, it is cooled to $-10°$ C. and there is rapidly added a solution of 70 parts of sodium methylate in 240 parts of methanol. A vigorous exothermic reaction takes place. It is stirred for another 15 minutes and cooled again to 0° C. 200 parts of isopropanol are then added and acidification effected with sulfuric acid of 10% strength until the Congo acid reaction is reached. After stirring for two hours, the orange-red crystals which have separated are filtered off by suction, washed with water and dried under reduced pressure.

275 parts of 13-(2'.6'.6'-trimethyl-cyclohexene-(1')-yl - (1')) - 3.7.11 - trimethyl - tridecahexaene - (2.4.6.8.10.12)-acid-(1) (XII) (homo-isopreno-vitamin A acid) are obtained; orange-red needles from isopropanol, melting point 186° to 188° C., $\lambda_{max}$ (in methanol)=397 millimicrons, $\epsilon$=66,000.

Example 8

90 parts of 4 - (2'.6'.6' - trimethyl - cyclohexene - (2')-ylidene)-butene-(2) (VII) and 165 parts of triphenylphosphine hydrobromide are stirred in 200 parts of acetonitrile until a clear solution is obtained (with occasional cooling). The solvent is then distilled off under reduced pressure and to the viscous oily residue there are added 250 parts of a mixture of methanol and benzene (1:1). The viscous oil is brought into solution by shaking and 55 parts of 4-methyl-hexadiene-(2.4)-al-(1) (see French patent specification No. 1,140,283) added. It is then cooled to $+5°$ C. and there are rapidly added 100 parts of a solution of 28 parts of sodium methylate in methanol. It is stirred for another hour at room temperature and worked up analogously to Example 5.

80 parts of axerophthene (deoxy-vitamin A) of the boiling point 140° to 145° C. at 0.05 Torr are obtained.

The product obtained is a cis-trans-isomer mixture from which the all-trans-isomer crystallises out on standing at a temperature of about 10° to 15° C. The crystals are isolated by trituration with ice-cold methanol and recrystallised from acetonitrile. 32 parts of all-trans-axerophthene of the melting point 76° C., $\lambda_{max}$ (in methanol)=325 millimicrons, $\epsilon$=49,000, are obtained. In rat tests this axerophthene shows vitamin A activity (about 55% as compared with vitamin A 100%).

Example 9

90 parts of 4 - (2'.6'.6' - trimethyl - cyclohexene - (2')-ylidene)-butene-(2) (VII) and 165 parts of triphenylphosphine hydrobromide are stirred at room temperature in 200 parts of dimethylformamide for about 12 hours until a clear solution is formed. Then 30 parts of 4.9-dimethyl - dodecatetraene - (2.4.8.10) - ine - (6) - dial-(1.12) are added and the whole stirred while heating slightly until solution takes place. It is cooled to $+10°$ C. and, without cooling, a solution of 30 parts of sodium methylate in 120 parts of methanol is allowed to flow in quickly. A violent reaction takes place (temperature rise to $+50°$ C.). It is stirred until cold and then poured onto ice and excess 10% phosphoric acid. The 15.15'-dehydro-beta-carotene formed is extracted with benzene. The dark red benzene solution is washed with water, dried over sodium sulphate and the benzene evaporated under reduced pressure until only a little is left. Then 200 parts of ethanol are added and the whole allowed to stand for a long time at $+5°$ C.; there thus crystallise out 52 parts of a stereomeric mixture of 15.15'-dehydro-beta-carotene (mainly the 9.9'-di-cis-isomers), melting point 74° to 80° C., yellow-orange crystalline powder, $\lambda_{max}$ (in hexane)=431 to 432 millimicrons, $\epsilon$=76,000.

By repeated fractional recrystallisation from benzene and methanol the pure all-trans-15.15'-dehydro-beta-carotene is obtained as brick-red leaflets of the melting point 154° C., $\lambda_{max}$ (in hexane)=432 to 433 millimicrons, $\epsilon$=98,000 and 457 millimicrons, $\epsilon$=79,000.

Example 10

90 parts of 4 - (2'.6'.6' - trimethyl - cyclohexene - (2')-ylidene)-butene-(2) and 165 parts of triphenylphosphine hydrobromide are suspended in 400 parts by volume of ethyl acetate and stirred for 48 hours at room temperature. The pale yellow clear solution is freed from solvent in vacuo and the viscous residue dissolved in 200 parts by volume of anhydrous tetrahydrofurane.

This solution is cooled to 0° C. and while cooling there is dripped in rather rapidly a solution of 60 parts of ethyl magnesium bromide in 180 parts by volume of tetrahydrofurane (content measured titrimetrically). It is stirred for another 15 minutes at 0° C. and then a solution of 30 parts of glycol aldehyde in 60 parts by volume of tetrahydrofurane is added. With an exothermic reaction and with the reaction mixture becoming lighter in colour, the reaction to beta-ionylidene ethanol takes place. After stirring for 3 hours at room temperature, 200 parts by volume of a saturated aqueous ammonium chloride solution are added, the tetrahydrofurane layer separated and fractionally distilled.

30 parts of beta-ionylidene ethanol of the boiling point 121° to 122° C. at 0.04 Torr are obtained; $\lambda_{max}$ (in methanol)=260 millimicrons, $\epsilon$=12,500.

*Example 11*

90 parts of 4 - (2'.6'.6' - trimethyl - cyclohexene - (2')-ylidene)-butene-(2) and 165 parts of triphenylphosphine hydrobromide are stirred in 200 parts by volume of acetonitrile until a clear solution has been formed. Then the solvent is distilled off completely in vacuo and the residue suspended in 250 parts by volume of anhydrous ether. The suspension is cooled to 0° C. and, while stirring powerfully, a solution of 42 parts of lithium phenyl in 200 parts by volume of absolute ether is slowly added (the content being determined titrimetrically). To the violet ethereal solution there is then added at 0° C. a solution of 50 parts of glyoxylic acid ethyl ester in 50 parts by volume of ether and the whole stirred first for 2 hours at room temperature and then boiled for 6 hours under reflux. It is cooled and poured onto ice and 10% phosphoric acid in excess. The ethereal solution is separated, washed with water, dried over sodium sulfate and the ether distilled off. The residue is suspended in petroleum ether and allowed to stand for 24 hours at 0° C. The deposited crystals are filtered off and the filtrate distilled fractionally.

35 parts of beta-ionylidene acetic acid ethyl ester are obtained of the boiling point 111° to 112° C. at 0.05 Torr $\lambda_{max}$ (in methanol)=301 to 302 millimicrons, $\epsilon$=15,000.

*Example 12*

90 parts of 4 - (2'.6'.6' - trimethyl-cyclohexene - (2')-ylidene)-butene-(2) and 195 parts of triphenyl phosphine hydroiodide (prepared from triphenylphosphine and hydroiodic acid) are stirred in 300 parts by volume of dimethylformamide for 4 hours at +5° C. Then 70 parts of 5-carboxy-4-methyl-pentadiene-(2,4)-al-(1), dissolved in 150 parts by volume of isopropanol, are added and the whole cooled to −20° C. While stirring powerfully, a solution of 190 parts of sodium methylate in 350 parts by volume of methanol is allowed to flow in rapidly. A vigorous exothermic reaction occurs. It is stirred for another 10 minutes and then 10% sulphuric acid is dripped in until there is a Congo acid reaction. After stirring for another 60 minutes, it is filtered by suction, the filter cake suspended in 2000 parts by volume of water and stirred for 5 hours. It is then filtered by suction and the residue crystallised from isopropanol.

80 parts of vitamin A acid are obtained in the form of a mixture of the all-trans and 9.10-cis isomers; melting point 141° to 158° C.

*Example 13*

90 parts of 4 - (2'.6'.6' - trimethyl-cyclohexene - (2')-ylidene)-butene-(2) are stirred with 165 parts of triphenyl-phosphine hydrobromide in 200 parts by volume of acetonitrile at room temperature until a clear solution is formed. Then the acetonitrile is completely distilled off in vacuo and the residue suspended in 100 parts by volume of benzene. This suspension is stirred at room temperature into a suspension of finely divided sodium amide (18 parts) in benzene. It is stirred for 12 hours with occasional cooling and then a solution of 55 parts of 4-methyl-hexadiene-(2.4)-al-(1) in 150 parts by volume of benzene is slowly dripped in while cooling. It is stirred for another hour at room temperature, 200 parts by volume of 10% sulphuric acid are cautiously added and the benzene solution separated.

The benzene solution is washed with water, dried over sodium sulphate and the solvent distilled off in vacuo. The residue has petroleum ether added to it and is then stirred for 10 hours at −5° C. It is then filtered and the filtrate fractionally distilled. There are thus obtained 65 parts of axerophthene of the boiling point 132° to 135° C. at 0.005 Torr.

*Example 14*

220 parts of vinyl-beta-ionol (see W. Oroshnik, G. Karmas and A. Melbane, J. Am. Chem. Soc., 74 (1952), page 300) are dissolved in 500 parts of benzene. After adding 0.3 part of para-toluenesulfonic acid and 0.5 part of alpha-tocopherol, it is heated to boiling and the benzene distilled off. The water formed is withdrawn from the distillate and the distilled benzene continuously returned to the reaction vessel. When no further formation of water takes place, the product is cooled and the red-yellow benzene solution shaken up first with aqueous bicarbonate solution and then with water. After drying over sodium sulfate, the benzene is evaporated and the residue distilled. 165 parts of 5 - (2'.6'.6' - trimethyl-cyclohexene-(2')-ylidene-(1')-)-3-methyl-pentadiene-1.3 (VIII) of the boiling point 72° C. at 0.1 Torr are obtained; $\lambda_{max}$ (in hexane)=313 millimicrons.

100 parts of the 5-(2'.6'.6'-trimethyl-cyclohexene-(2')-ylidene-(1')-)-3-methyl-pentadiene-(1.3) are stirred with 150 parts of triphenylphosphine hydrochloride in 200 parts of dimethylformamide for 12 hours at +10° C. The yellow solution is then cooled to −10° C. There are then allowed to flow in slowly simultaneously from two separate storage vessels 40 parts of methylcrotonaldehyde and 87 parts of a 30% solution of sodium methylate in methanol. The whole is stirred for 30 minutes at −10° C. and for 2 hours at +20° C. Then 110 parts of 10% sulfuric acid are added. An oil is precipitated and is extracted with petroleum ether. The petroleum ether extracts are washed with water, dried with sodium sulphate at +5° C. for 12 hours and filtered. The filtrate is filtered through a column of aluminum oxide (activity 2 according to Brockmann) and freed from petroleum ether by distillation. About 40 parts of initial material (VIII) are recovered. At a boiling point of 135° to 140° C. at 0.005 Torr there distil over 55 parts of axerophthene (deoxy-vitamin A) which upon standing at low temperature slowly crystallises and after recrystallisation from acetonitrile has a melting point of 75° to 76° C.; $\lambda_{max}$ (in methanol)=325 millimicrons, $\epsilon$=48,000.

*Example 15*

100 parts of 5 - (2'.6'.6' - trimethyl - cyclohexene-(2')-ylidene - (1') - ) - 3-methyl-pentadiene-(1.3) (VIII) are stirred with 180 parts of triphenylphosphine hydrobromide in 200 parts of dimethylformamide for 6 hours at +15° C. The yellow solution is cooled to −10° C. and there are slowly allowed to flow into it, as described in Example 14, 80 parts of beta-formylcrotonic acid ethyl ester dissolved in 80 parts of dimethylformamide, and 87 parts of a 30% solution of sodium methylate in methanol. After analogous working up, as described in Example 14, 30 parts of unreacted initial material and 75 parts of vitamin A acid ethyl ester of the boiling point 165° to 170° C. at 0.005 Torr are obtained.

The saponification of the ester thus obtained yields all-trans vitamin A acid of the melting point 178° to 179° C., $\lambda_{max}$ (in methanol)=351 to 352 millimicrons, $\epsilon$=41,000.

*Example 16*

100 parts of 5-(2'.6'.6'-trimethyl-cyclohexene-(2')-ylidene-(1')-)-3-methyl-pentadiene-(1.3) are stirred with 150 parts of triphenylphosphine hydrochloride in 200 parts of dimethylformamide at room temperature for 24 hours. Then 60 parts of beta-formylcrotonic acid are added to the yellow solution. After cooling to −20° C., 242 parts of a 30% solution of sodium methylate in methanol are allowed to flow in. It is then stirred for another 4 hours at 0° C. and the reaction mixture thereupon poured onto ice and excess 10% phosphoric acid. It is extracted with ether, the red-yellow ethereal solution washed with water and shaken up with 5% ammonia solution. The fawn-brown ammoniacal solution is shaken out repeatedly with ether and then acidified with 10% sulphuric acid while cooling with ice, whereby vitamin A acid is partly precipitated in crystalline form. The precipitated acid is taken up in ether, the yellow ethereal solution washed with water, dried over sodium sulfate and the ether distilled off. The residue is stirred with ice-cold methanol and filtered by suction. 40 parts of vitamin A acid are obtained which after a single recrystallisation from methanol has a melting point of 178° to 179° C., $\lambda_{max}$ (in methanol)=351 to 352 millimicrons, $\epsilon$=40,000.

*Example 17*

200 parts of 5-(2'.6'.6'-trimethyl-cyclohexene-(2')-ylidene-(1')-)-3-methyl-pentadiene-(1.3) are stirred with 300 parts of triphenylphosphine hydrochloride in 400 parts of dimethyl formamide for 12 hours at +10° C. From two separate storage vessels there are then dripped in simultaneously 174 parts of a 30% solution in methanol of sodium methylate and a solution of 160 parts of gamma-acetoxy-alpha-methyl-crotonaldehyde (boiling point 95° to 97° at 15 Torr) in 110 parts of dimethylformamide. The reaction solution is kept at −10° C. by cooling. It is further stirred for 5 hours at 0° C. and acidified with dilute phosphoric acid. The pale yellow oily suspension is then extracted with petroleum ether. The petroleum ether extracts are washed with water, dride with sodium sulphate, filtered and the filtrate concentrated to a volume of about 400 parts by volume. This petroleum ether extract is filtered through an aluminum oxide column (activity 2 to 3 according to Brockmann). The filtrate under nitrogen and in vacuo is freed from petroleum ether and, in a short path distillation plant at 70° C. and 0.0001 Torr, from constituents of lower boiling point. The residue which remains amounts to 150 parts and shows $\lambda_{max}$ (in isopropanol) of 324 to 325 millimicrons, $\epsilon$=33,000. The vitamin A acetate concentrate thus obtained can be further purified by chromatographic adsorption. 50 parts are dissolved in 75 parts of hexane and chromatographed on aluminum oxide (activity 3 to 4 according to Brockmann). After a first runnings, which consists mainly of unreacted initial material, pure all-trans vitamin A acetate is eluted; upon standing in a little methanol it partly crystallizes at +5° C.; melting point 57° to 58° C., $\lambda_{max}$ (in isopropanol)=325 millimicrons, $\epsilon$=47,000; the yield amounts to 12 parts.

*Example 18*

88 parts of vinyl-beta-ionol in 300 parts of benzene are subjected, after the addition of 0.1 part of para-toluenesulfonic acid, to the splitting off of water in the way described in Example 14. After cooling the reaction solution and shaking out with sodium bicarbonate solution and water, the benzene is distilled off and the residue, without further purification, is stirred with 106 parts of triphenylphosphine. Into the pasty mixture there is dripped at 0° C. under nitrogen a solution of 21 parts of hydrogen chloride gas in 220 parts of methanol. This reaction solution is stirred for 18 hours at room temperature and then dripped, simultaneously with a solution of 32 parts of potassium hydroxide in 150 parts of methanol at −15° C. under nitrogen into a mixture of 68 parts of beta-formylcrotonic acid ethyl ester and 40 parts of methanol. It is then further stirred for an hour at room temperature. The reaction mixture is extracted repeatedly with petroleum ether. The combined petroleum ether extracts are washed neutral with water and dried over sodium sulfate. After distilling off the petroleum ether there remain 49 parts of crude vitamin A acid ethyl ester in the residue ($\lambda_{max}$ (in methanol)=353 millimicrons, $\epsilon$=22,000).

*Example 19*

200 parts of 5-(2'.6'.6'-trimethyl-cyclohexene-(2')-ylidene-(1'))-3-methyl-pentadiene-(1.3) are dissolved in 500 parts of dimethylformamide and, after the addition of 330 parts of triphenylphosphine hydrobromide, stirred for 36 hours at room temperature while leading nitrogen over. 100 parts of alpha-methylacrolein are added and the clear solution cooled to −5° C. While stirring powerfully and while cooling there is then added rather quickly a solution of 54 parts of sodium methylate in 180 parts of methanol. It is stirred for another 3 hours at room temperature, covered with 300 parts of petroleum ether and 150 parts of a 10% phosphoric acid are added. After thoroughly mixing, the pale yellow colored petroleum ether solution is separated. This operation is repeated three times, the combined petroleum ether solutions washed well several times with water and dried for 12 hours at −5° C. over sodium sulfate. After filtration, the filtrate is distilled. There are obtained 155 parts of 8-(2'.6'.6'-trimethylcyclohexene-(1')-yl-(1'))-2.6 - dimethyl-octatetraene-(1.3.5.7) of the boiling point 135° to 138° C. at 0.05 Torr, $\lambda_{max}$ (in hexane) 319 millimicrons, $\epsilon$=44,000 as a pale yellow very autoxidizable oil.

*Example 20*

200 parts of 5-(2'.6'.6'-trimethyl-cyclohexene-(2')-ylidene-(1')-)-3-methyl-pentadiene-(1.3) are stirred in 500 parts of dimethylformamide with 265 parts of triphenylphophine for 36 hours at room temperature; then 36 parts of hydrogen chloride dissolved in 150 parts of methanol (HCl content determined titrimetrically) are added and the whole stirred for another 3 hours. A clear solution forms which, after the addition of 80 parts of formic acid ethyl ester is cooled to 0° C. and a solution of 60 parts of sodium methylate in 200 parts of methanol quickly added. It is stirred for another 12 hours at room temperature, covered with 250 parts of petroleum ether and a procedure analogous to that described in Example 19 followed.

120 parts of 6-(2'.6'.6'-trimethyl-cyclohexene-(1')-yl-(1')-)-1-ethoxy-4-methyl-hexatriene-(1.3.5) of the boiling point 110° to 113° C. at 0.05 Torr are obtained.

*Example 21*

200 parts of 5-(2'.6'.6'-trimethyl-cyclohexene-(2')-ylidene-(1')-)-3-methyl-pentadiene-(1.3) are stirred, after the addition of 300 parts of triphenylphosphine hydrochloride and 400 parts of acetonitrile, for 48 hours at room temperature. The bulk of the solvent is distilled off under reduced pressure and the resultant pale yellow viscous oil is dissolved in a mixture of 500 parts of methanol/benzene (1:1). The solution is cooled to +5° C. and there are dripped into the same, separately but simultaneously, 120 parts of alpha-methyl-beta-ethoxy-acrolein and a solution containing 56 parts of sodium methylate in 180 parts of methanol. During the dripping in, the solution is kept at +5° C. to +10° C. It is stirred for another 5 hours at room temperature and 100 parts of water are added. The benzene solution is separated and the aqueous layer extracted several times with petroleum ether. The combined petroleum ether-benzene solution is washed with water, dried for 12 hours over sodium sulfate at 0° C. and filtered through a small aluminum oxide column (standardized according to Brockmann). The filtrate is distilled in a high vacuum.

170 parts of 8-(2'.6'.6'-trimethyl-cyclohexene-(1')-yl-(1'))-2.6-dimethyl-1-ethoxy-octatetraene-(1.3.5.7) of the boiling point 135° to 140° C. at 0.001 Torr are obtained.

*Example 22*

100 parts of 5-(2'.6'.6'-trimethyl-cyclohexene-(2')-ylidene-(1')-)-3-methyl-pentadiene-(1.3) are dissolved in 250 parts of dimethylformamide and, after the addition of 115 parts of triphenylphosphine hydrobromide, stirred at room temperature for 36 hours while leading nitrogen over. Then 90 parts of 7-carboxy-2.6-dimethyl-heptatriene-(2.4.6)-al-(1) (obtained by saponification of the ethyl ester obtainable according to British patent specification No. 784,628, melting point 193° to 194° C.) are added and the whole stirred until a clear solution has been formed. It is then cooled to −20° C. and a solution of 40 parts of sodium hydroxide in 200 parts of methanol is dripped in rapidly while stirring powerfully and while cooling. A vigorous exothermic reaction takes place, and the temperature rises to +30° C. The dark solution is stirred for another 15 minutes at room temperature, again cooled to −10° C. and neutralized with 10% sulfuric acid until a congo acid reaction is reached. Fine pale orange crystals of 13-(2'.6'.6'-trimethyl-cyclohexene - (1') - yl-(1')-)-3.7.11-trimethyl-tridecahexaene - (2.4.6.8.10.12.)-acid-(1) (homoisopreno vitamin A acid). It is filtered off and washed with water and crystallized from isopropanol. There are obtained 95 parts of homoisopreno vitamin A acid in the form of orange-red needles of the melting point 186° to 188° C., $\lambda_{max}$ (in menthanol)=397 millimicrons, $\epsilon$=68,000.

*Example 23*

100 parts of 5-(2'.6'.6'-trimethyl-cyclohexene-(2')-ylidene-(1')-)-3-methyl-pentadiene-(1.3) are dissolved in 250 parts of dimethylformamide and, after the addition of 115 parts of triphenylphosphine hydrobromide stirred at room temperature for 36 hours while leading nitrogen over. 30 parts of 2.7-dimethyl-octatriene-(2.4.6)-dial-(1.8) are added, the whole stirred until a clear solution has been formed and then a solution of 30 parts of sodium methylate in 100 parts of methanol added quickly without cooling. The whole becomes dark in color and a vigorous reaction takes place (up to +50° C.). It is stirred for another 3 hours and the precipitated red crystals are filtered off by suction. These are dissolved in a little benzene; the solution is mixed with about five times the amount of ethanol. Upon standing there crystallize out 28 parts of all-trans-beta-carotene of the melting point 178° to 179° C., $\lambda_{max}$(in hexane)=452 millimicrons ($\epsilon$=148,000) and 481 millimicrons ($\epsilon$=133,000). 80 parts of 10% phosphoric acid are added to the mother liquor and extracted several times with benzene. The deep red benzene solution is washed with water, dried over sodium sulfate and boiled under reflux for 2 hours with a granule of iodine. It is then washed with dilute sodium thiosulfate solution and with water and the benzene distilled off in vacuo down to a small residue. After adding a mixture of methanol and ethanol, 8 parts of all-trans-beta-carotene crystallize out.

*Example 24*

100 parts of 5-(2'.6'.6'-trimethyl-cyclohexene-(2')-ylidene-(1')-)-3-methyl-pentadiene-(1.3) are dissolved in 250 parts by volume of dimethylformamide. Then 155 parts of tritolylphosphine are introduced and stirred until a clear solution has formed. After cooling to 0° C., a solution of 18 parts of hydrogen chloride gas in 100 parts by volume of methanol (content titrimetrically determined) is slowly dripped in and stirred for another 8 hours at 0° C. There are now added 60 parts of alpha-methyl-gamma-ethoxy-croton-aldehyde (prepared by reaction of ethoxyglycol aldehyde diethyl acetal with propenyl ethyl ether in the presence of zinc chloride and acid hydrolysis of the reaction product; colorless oil of the boiling point 74° to 78° C. at 15 Torr having a somewhat pungent odor), and then a solution of 35 parts of sodium methylate in 100 parts of ethyl alcohol is dripped in fairly quickly. It is stirred for another 30 minutes at room temperature and 100 parts by volume of 10% sulfuric acid added. By extraction with petroleum ether, the reaction product is isolated. The petroleum ether solution is washed with water, dried over sodium sulfate and filtered through a column of aluminum oxide (400 parts) (activity 3 according to Brockmann). That portion of the filtrate is collected which gives a pure cornflower blue color with antimony chloride in chloroform by the spot test. After evaporation or the solvent in vacuo there is obtained a golden yellow viscous oil which consists of vitamin A ethyl ether, $\lambda_{max}$(in hexane)=325 millimicrons, $\epsilon$=33,000; yield 42 parts.

*Example 25*

100 parts of 5-(2'.6'.6'-trimethyl-cyclohexene-(2')-ylidene-(1')-)-3-methyl-pentadiene-(1.3) are dissolved in 250 parts by volume of dimethylformamide and, after the addition of 150 parts of triphenylphosphine hydrochloride, stirred for 8 hours at +5° C. 24 parts of sodium acetylide are then added and stirred for another 48 hours at −5° C. To the deep violet colored solution there are then dripped 60 parts of beta-formylcrotonic acid butyl ester (boiling point 110° C. at 15 Torr) and stirred at room temperature for 10 hours. After adding 200 parts by volume of 10% phosphoric acid, it is extracted with petroleum ether. The dark yellow petroleum ether solution is washed with water, dried over sodium sulfate and filtered through a column filled with 500 parts of aluminum oxide (activity 2 to 3 according to Brockmann). The filtrate is freed from solvent by distillation in vacuo. The residue of 35 parts shows $\lambda_{max}$ (in methanol) of 351 to 352 millimicrons, $\epsilon$=36,000, and consists of vitamin A acid butyl ester. A sample is saponified alkaline and yields all-trans vitamin A acid of the melting point 179° to 180° C. (from cyclohexane).

*Example 26*

150 parts by volume of 1.4-normal methanolic sulfuric acid are dripped under a nitrogen atmosphere at 5° C. into a mixture of 40 parts of 5-(2'.6'.6'-trimethyl-cyclohexene-(2') - ylidene - (1')-)-3 - methyl-pentadiene-(1.3) and 52 parts of triphenylphosphine. The mixture is stirred for 6 hours at room temperature. There are then added at 0° C. 30 parts of beta-formylcrotonic acid methyl ester in 30 parts of methanol and then 200 parts by volume of a 3-normal methanolic ammonia solution. The solution is stirred for 20 hours at room temperature and then extracted with petroleum ether until the extract no longer shows a violet-red coloration with Carr-Price reagent. The combined extracts are washed neutral and dried over sodium sulfate. After distilling off the petroleum ether there remain 32 parts of crude vitamin A acid methyl ester as an oil $\lambda_{max}$=353 millimicrons, $\epsilon$=15,000.

*Example 27*

100 parts by volume of a 1.3-normal methanolic solution of para-toluenesulfonic acid are dripped at +10° C. under nitrogen into a mixture of 27 parts of 5-(2'.6'.6'-trimethylcyclohexene-(2')-ylidene-(1')-)-3-methyl - pentadiene-(1.3), 34 parts of triphenylphosphine and 40 parts of methanol. The mixture is stirred for 16 hours at room temperature and then at +10° C. there are added 16 parts of beta-formylcrotonic acid methyl ester and then 11.5 parts of piperidine. The temperature thereby rises to about +30° C. It is further stirred for 6 hours at room temperature. 30 parts of water are added to the reaction solution and it is exhaustively extracted with petroleum ether. After washing the extract with water and drying over sodium sulfate, the petroleum ether is distilled off. The residue consists of vitamin A acid methyl ester, boiling point 150° to 155° C. at 0.005 Torr; yield 9 parts.

*Example 28*

150 parts by volume of 1.4-normal methanolic hydrochloric acid are dripped at 0° C. into a mixture of 40 parts of 5-(2'.6'.6'-trimethyl-cyclohexene-(2')-ylidene-(1)-)-3-methyl-pentadiene-(1.3) and 52 parts of triphenylphosphine. The mixture is stirred for 5 hours at room temperature and then it is dripped, simultaneously with a suspension of 8 parts of calcium hydroxide in 60 parts of methanol at −25° C. into a solution of 30 parts of beta-formylcrotonic acid methyl ester in 30 parts of methanol. The reaction solution is stirred for 16 hours further at room temperature and then extracted several times with petroleum ether. The combined petroleum ether extracts are washed with water and dried over sodium sulfate. After distilling off the petroleum ether there remain 20 parts of crude vitamin A acid methyl ester as an oily residue, $\lambda_{max}$=354 millimicrons, $\epsilon$=17,200.

*Example 29*

25 parts of a 60% concentrate of 9-(2'.6'.6'-trimethyl-cyclohexene-(2')-ylidene-(1')-)-3.7-dimethyl - nonatetraene-( 1.3.5.7)-(anhydro vitamin A (X)), 25 parts of triphenylphosphine and 30 parts of methanol are stirred at room temperature under nitrogen. 50 parts by volume of 2.2-normal methanolic sulfuric acid are dripped in and stirred again for 5 hours at room temperature. This solution is dripped, simultaneously with 50 parts by volume of 2.2-normal methanolic caustic potash at 0° C. under nitrogen into a suspension of 14 parts of 7-carbethoxy-2.6 - dimethyl-heptatriene-(2.4.6)-al-(1) in 60 parts of methanol and the reaction mixture is stirred for another 15 hours at room temperature. There are thereby precipitated 14 parts of the ethyl ester of 17-(2'.6'.6'-trimethyl - cyclohexene-(1')-yl-(1')-)-3.7.11.15-tetramethyl-heptadeca-octaene - (2.4.6.8.10.12.14.16)-acid (1) (XVI) which is filtered off. It still contains inorganic salts. (Melting point after recrystallization from alcohol: 132° C., $\lambda_{max}$=436 millimicrons, 462 millimicrons; $\epsilon_{436}$=100,200.) The mother liquor contains further 6 parts of this ester which can be recovered therefrom by addition of water and extraction of this mixture with ether.

*Example 30*

90 parts of a 60% concentrate of 9-(2'.6'.6'-trimethyl-cyclohexene - (2') - ylidene - (1')-)-3.7 - dimethyl - nonatetraene-(1.3.5.7) and 90 parts of triphenylphosphine are stirred with 100 parts of absolute alcohol under nitrogen. Then 70 parts by volume of 5-normal alcoholic hydrochloric acid are dripped in at room temperature. The mixture is stirred for 24 hours and simultaneously dripped in under nitrogen with 90 parts by volume of alcoholic 4-normal caustic potash into a solution of 60 parts of vitamin A aldehyde in 60 parts of absolute alcohol at 0° C. After stirring for 2 hours, the precipitate is filtered off and the filtrate extracted with cyclohexene after 40 parts of water have been added. The precipitate is also brought into solution with cyclohexane and water. The combined cyclohexane layers are washed with water, dried over sodium sulfate and evaporated in vacuo. The residue amounts to 150 parts. It is recrystallized from a mixture of benzene and methanol. 35 parts of beta-carotene of the melting point 176° C. are thereby obtained.

*Example 31*

28 parts of anhydro vitamin A are suspended together with 36 parts of triphenylphosphine hydrochloride in 130 parts by volume of dimethylformamide and stirred for 12 hours at +10° C. The clear yellow-red solution thus obtained is cooled to 0° C. and from two separate dropping funnels there are allowed to flow 14 parts of beta-formylcrotonic acid ethyl ester dissolved in 50 parts by volume of dimethylformamide, and at the same time an about 30% solution of 8 parts of sodium methylate in methanol. Further procedure is as described in Example 29. 14.5 parts of homo-isopreno vitamin A acid ethyl ester of the melting point 111° C. are obtained, $\lambda_{max}$ (methanol) 339 m$\mu$, $\epsilon$=74,200.

*Example 32*

28 parts of anhydro-vitamin A and 26 parts of triphenylphosphine are dissolved in 100 parts of dimethylformamide and at 0° C. there is slowly dripped in a solution of 3.6 parts of hydrogen chloride gas in 40 parts by volume of methanol (HCl-content determined titrimetrically). It is stirred for 12 hours at +5° C. and 10 parts of trans-beta-formylcrotonic acid (melting point 66° C., obtained by alkaline saponification of the diethyl acetal of beta-formylcrotonic acid ethyl ester and deacetalizing the reaction product) are added. It is then cooled to −5° C. and an about 30% solution of 20 parts of sodium methylate in methanol added rapidly. A vigorous exothermic reaction occurs. It is further stirred for 15 minutes at room temperature, 40 parts by volume of isopropanol are added and it is acidified with 10% sulfuric acid until there is a congo acid reaction. It is further stirred for two hours at room temperature and the precipitated orange-red crystals are then filtered off by suction. There are obtained 13 parts of 13-(2'.6'.6' - trimethyl - cyclohexene - (1') - yl - (1') - )-3.7.11 - trimethyl - tridecahexaene - (2.4.6.8.10.12) - acid-(1) (homo-isopreno-vitamin A acid) in the form of orange-red needles (after recrystallization from isopropanol), melting point 186° C. to 188° C., $\lambda_{max}$ (in methanol)=396 millimicrons, $\epsilon$=68,000.

We claim:

1. A process for the production of compounds bearing the cyclogeranylidene radical which comprises reacting a compound of the formula

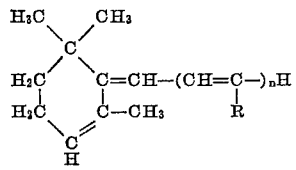

wherein $n$ represents one of the figures 0, 1, 2, 3 and 4 and R is selected from the group consisting of H and $CH_3$ with a triarylphosphine and a proton donor on the one hand and with an oxo compound and a proton acceptor on the other hand.

2. The process as claimed in claim 1 wherein the triarylphosphine and the proton donor are combined to form a hydrosalt of the triarylphosphine.

3. The process as claimed in claim 2 wherein the hydrosalt of the triarylphosphine is the salt of the triarylphosphine and an inorganic acid.

4. The process as claimed in claim 1 wherein the aryl radicals of the triarylphosphine are monocyclic hydrocarbon radicals.

5. The process which comprises reacting the compound of the formula

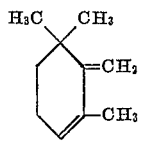

with a triarylphosphine and a proton donor on the one hand and with an oxo compound and a proton acceptor on the other hand.

6. The process which comprises reacting the compound of the formula

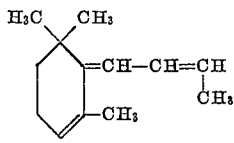

with a triarylphosphine and a proton donor on the one hand and with an oxo compound and a proton acceptor on the other hand.

7. The process which comprises reacting the compound of the formula

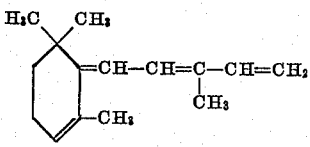

with a triarylphosphine and a proton donor on the one hand and with an oxo compound and a proton acceptor on the other hand.

8. The process which comprises reacting the compound of the formula

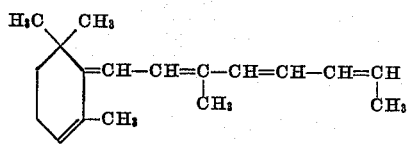

with a triarylphosphine and a proton donor on the one hand and with an oxo compound and a proton acceptor on the other hand.

9. The process which comprises reacting the compound of the formula

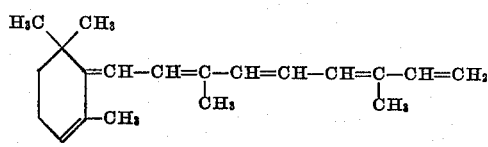

with a triarylphosphine and a proton donor on the one hand and with an oxo compound and a proton acceptor on the other hand.

10. The process as claimed in claim 1 wherein the proton donors are inorganic acids.

11. The process as claimed in claim 1 wherein the proton acceptors are inorganic bases.

12. The process as claimed in claim 1 wherein the proton acceptors are organo-metallic compounds.

13. The process as claimed in claim 1 wherein the oxo compounds are aldehydes.

14. The process as claimed in claim 13 wherein the aldehyde is a member of the class consisting of aliphatic aldehydes with from 1 to 30 carbon atoms in the chain.

15. The process as claimed in claim 1 wherein the oxo compounds are dialdehydes.

16. The process as claimed in claim 15 wherein the aldehyde is a member of the class consisting of aliphatic aldehydes with from 1 to 30 carbon atoms in the chain.

17. The process as claimed in claim 1 wherein the oxo compound is a formic acid ester.

18. The process as claimed in claim 17 wherein the formic acid ester is one derived from a lower alcohol with from 1 to 5 carbon atoms.

19. The process as claimed in claim 1 which comprises carrying out the reaction in the presence of a highly polar solvent, selected from the class consisting of dimethyl formamide, acetonitrile, methanol, acetic esters and nitrobenzene.

20. The process as claimed in claim 1 which comprises carrying out the reaction at a temperature between minus 20° C. and plus 30° C.

21. The acid of the formula

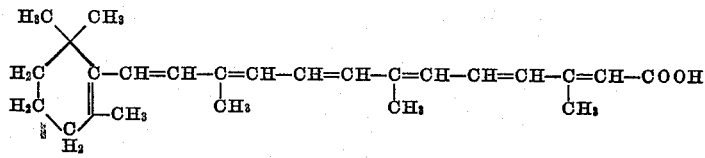

22. The acid of the formula

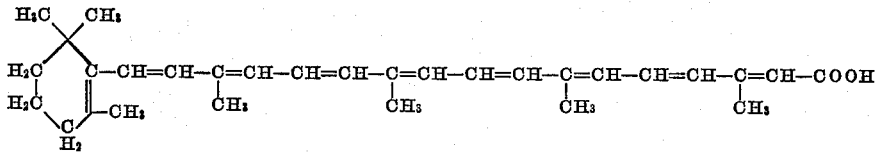

23. A lower aliphatic ester of the acid as claimed in claim 21.

24. A lower aliphatic ester of the acid as claimed in claim 22.

No references cited.

UNITED STATES PATENT OFFICE
CERTIFICATION OF CORRECTION

Patent No. 2,957,933                                  October 25, 1960

Horst Pommer et al.

It is hereby certified that error appears in the above numbered patent requiring correction and that the said Letters Patent should read as corrected below.

Column 7, line 30, for "hexane-" read -- hexene- --; column 11, line 24, for "94° C." read -- 93° C. --; column 16, line 29, for "phophine" read -- phosphine --; column 19, line 52, for "cyclohexene" read -- cyclohexane --.

Signed and sealed this 23rd day of May 1961.

(SEAL)
Attest:

ERNEST W. SWIDER                             DAVID L. LADD
Attesting Officer                               Commissioner of Patents